(12) United States Patent
Stommel

(10) Patent No.: US 7,522,976 B2
(45) Date of Patent: Apr. 21, 2009

(54) METHOD FOR ADAPTING A WIND ENERGY INSTALLATION TO GIVEN WIND CONDITIONS

(75) Inventor: Matthias Stommel, Ganderkesee (DE)

(73) Assignee: Daubner & Stommel GBR-Werk-Planung, Ganderkesee (DE)

(*) Notice: Subject to any disclaimer, the term of this patent is extended or adjusted under 35 U.S.C. 154(b) by 0 days.

(21) Appl. No.: 11/530,947

(22) Filed: Sep. 12, 2006

(65) Prior Publication Data

US 2007/0067067 A1 Mar. 22, 2007

(30) Foreign Application Priority Data

Sep. 22, 2005 (DE) .................. 10 2005 045 516

(51) Int. Cl.
*G06F 19/00* (2006.01)
*F03D 9/00* (2006.01)
*H02P 9/04* (2006.01)

(52) U.S. Cl. .................. 700/287; 290/44; 416/11; 416/31; 416/46

(58) Field of Classification Search .................. 700/287; 290/44; 416/11, 31, 46
See application file for complete search history.

(56) References Cited

U.S. PATENT DOCUMENTS 4,149,092 A * 4/1979 Cros .................. 290/54

(Continued)

FOREIGN PATENT DOCUMENTS

DE 197 31 918 A1 7/1997

(Continued)

OTHER PUBLICATIONS

DE Search Report No. 10 2005 045 516.6 dated Jul. 4, 2006.

*Primary Examiner*—Michael D Masinick
(74) *Attorney, Agent, or Firm*—Laurence P. Colton; Smith, Gambrell & Russell

(57) ABSTRACT

A method for operating a wind energy installation, in particular for adapting a wind energy installation (10) to given wind conditions, the wind energy installation (10) having a rotor (16), which can be driven by wind, with at least two rotor blades (20), whose respective angles of incidence of the wind can be adjusted by means of at least one adjustment device, and having a generator for converting the mechanical energy of the rotor (16) to electrical energy. During operation of the wind energy installation, parameters are measured with spatial and/or temporal resolution on the side of the wind energy installation (10) facing the wind, said parameters describing the wind conditions in the measurement region, preferably the wind speed and/or the wind direction. The wind parameters are measured at various vertical distances from the ground, namely various heights, and at horizontal distances from the rotor (16), which are selected such that the angles of incidence of the wind on the individual rotor blades (20) can be adapted in response to the measured wind parameters before the wind on which the wind parameters are based, in particular a wind front or a gust of wind, reaches the rotor (16). Values are predicted or calculated, in particular continuously or periodically, from the measured wind parameters—prognosis values—which describe wind conditions occurring in the future at the rotor blades for various heights. The angles of incidence of the wind on the individual rotor blades (20) are adjusted individually and independently of one another, preferably a plurality of times during a complete revolution of a rotor blade, depending on these predicted or calculated prognosis values at the various heights.

3 Claims, 4 Drawing Sheets

U.S. PATENT DOCUMENTS

| | | | |
|---|---|---|---|
| 4,160,170 A * | 7/1979 | Harner et al. | 290/44 |
| 4,435,646 A * | 3/1984 | Coleman et al. | 290/44 |
| 5,289,041 A * | 2/1994 | Holley | 290/44 |
| 5,855,098 A * | 1/1999 | Bromer | 52/175 |
| 6,320,272 B1 * | 11/2001 | Lading et al. | 290/44 |
| 6,361,275 B1 * | 3/2002 | Wobben | 416/33 |
| 6,749,399 B2 * | 6/2004 | Heronemus | 416/41 |
| 7,025,567 B2 * | 4/2006 | Wobben | 416/1 |
| 7,256,508 B2 * | 8/2007 | Altemark et al. | 290/44 |
| 2003/0049128 A1 * | 3/2003 | Rogan | 416/131 |
| 2004/0207207 A1 * | 10/2004 | Stahlkopf | 290/44 |
| 2006/0002793 A1 * | 1/2006 | Yoshida | 416/11 |

FOREIGN PATENT DOCUMENTS

| | | |
|---|---|---|
| DE | 199 34 415 B4 | 7/1999 |
| DE | 100 11 393 A1 | 3/2000 |
| DE | 100 33 183 C2 | 7/2000 |
| DE | 101 06 208 A1 | 2/2001 |
| DE | 101 37 272 A1 | 7/2001 |
| DE | 103 23 785 A1 | 5/2003 |
| GB | 2398841 A * | 9/2004 |

* cited by examiner

METHOD FOR ADAPTING A WIND ENERGY INSTALLATION TO GIVEN WIND CONDITIONS

STATEMENT OF RELATED APPLICATIONS

This patent application claims convention priority on German Patent Application No. 10 2005 045 516.6 having a filing date of 22 Sep. 2005, which is incorporated herein by this reference.

BACKGROUND OF THE INVENTION

1. Technical Field

The present invention relates to a method for operating a wind energy installation, in particular for adapting a wind energy installation to given wind conditions, the wind energy installation having a rotor, which can be driven by wind, with at least one rotor blade, and having a generator for converting the mechanical energy of the rotor to electrical energy. Furthermore, the invention relates to a method for operating a windpark comprising such wind energy installations and to a wind energy installation having a control/regulation device for carrying out the abovementioned method.

2. Prior Art

It is known to regulate wind energy installations depending on given wind conditions or to drive individual components of the wind energy installation depending on the wind conditions. It is known, for example, to arrange a wind vane at the rear end of a pod of a wind energy installation, i.e. on the side of the wind energy installation remote from the wind. Depending on the wind direction determined by means of the wind vane, in this case in particular the so-called yaw drive mechanism of the wind energy installation is regulated. In this case, the rotor of the wind energy installation tracks the present wind direction by means of corresponding motors, with the result that, as much as possible, it is at right angles to the present wind direction. One disadvantage with the measurement of the wind using the rear end of the pod is in particular the fact that the wind conditions present there are severely influenced by the rotor, in particular the rotor blades, which is arranged upstream of the wind vane based on the wind flow. The wind conditions at the location of the wind vane therefore often do not correspond to the wind conditions at the location of the rotor blades or directly in front of the rotor blades. The result of this is the fact that the regulation of the wind energy installations is often not optimal.

Furthermore, a method for adapting a wind energy installation to existing wind conditions is known from the prior art in which, depending on the present power output of the wind energy installation, i.e. at least indirectly depending on the present wind conditions at the location of the rotor blades, the angle of incidence on individual or all of the rotor blades of the wind energy installation is adjusted. In this case, in one embodiment of this prior art, at high wind speeds which, in the worst case scenario, could lead to destruction of the rotor blades of the wind energy installation, and therefore in the case of a critically high power output of the wind energy installation, the rotor blades are rotated about their respective longitudinal axis in order to provide less resistance to the wind and to avoid damage. One disadvantage with this prior art is in particular the inertia of the method. The wind energy installation only responds to changing wind conditions when the corresponding wind fronts or gusts of wind have already reached the rotor blades of the installation and have already resulted in a certain, possibly even critical increase in the power output of the wind energy installation. For example, sudden, particularly strong gusts of wind or turbulences can in this case result in destruction of the installations since they are only registered when they have already reached the rotor blades of the installation.

BRIEF SUMMARY OF THE INVENTION

One object of the present invention is, in particular, to specify a method for adapting a wind energy installation to given wind conditions of the type mentioned initially, in which particularly short response times of the installation to changing wind conditions are provided. Furthermore, one object of the present invention is to specify a corresponding method for operating a windpark and a wind energy installation for carrying out the method.

This object is achieved by a method for operating a wind energy installation, in particular for adapting a wind energy installation to given wind conditions, the wind energy installation having a rotor, which can be driven by wind, with at least two rotor blades, whose respective angles of incidence of the wind can be adjusted by means of at least one adjustment device, and having a generator for converting the mechanical energy of the rotor to electrical energy, characterized by the following steps:

a) during operation of the wind energy installation, parameters are measured with spatial and/or temporal resolution on the side of the wind energy installation facing the wind, said parameters describing the wind conditions in the measurement region, preferably the wind speed and/or the wind direction, b) the wind parameters are measured at various vertical distances from the ground, namely various heights, c) the wind parameters are measured at horizontal distances from the rotor, which are selected such that the angles of incidence of the wind on the individual rotor blades can be adapted in response to the measured wind parameters before the wind on which the wind parameters are based, in particular a wind front or a gust of wind, reaches the rotor, d) values are predicted or calculated, in particular continuously or periodically, from the measured wind parameters—prognosis values—which describe wind conditions occurring in the future at the rotor blades for various heights, and e) the angles of incidence of the wind on the individual rotor blades are adjusted individually and independently of one another, preferably a plurality of times during a complete revolution of a rotor blade, depending on these predicted or calculated prognosis values at the various heights.

This object also is achieved by a method for operating a wind energy installation or a windpark comprising such wind energy installations, the wind energy installation having a rotor, which can be driven by wind, with at least one rotor blade, and having a generator for converting the mechanical energy of the rotor to electrical energy, characterized by the following steps:

a) during operation of the wind energy installation/the windpark, parameters are measured on the side of the wind energy installation facing the wind, which parameters describe the wind conditions in the measurement region, b) the wind parameters are measured at horizontal distances from the rotor, which are selected such that at least one operational parameter of the wind energy installation, for example the angles of incidence of the wind on the rotor blade, can be adjusted in response to the measured wind parameters before the wind on which the wind parameters are based, in particular a wind front or a gust of wind, reaches the rotor, c) depending on the measured wind parameters, the power output of the wind energy installation/the windpark to a superordinate power supply system to which the wind energy installation/the windpark is connected is controlled/regulated, and d) the regulation/control of the power output takes place depending on the measured wind parameters in accordance with predetermined power output scenarios.

This object also is achieved by a method for operating a wind energy installation or a windpark comprising such wind energy installations, the wind energy installation having a rotor, which can be driven by wind, with at least one rotor blade, having a generator for converting the mechanical energy of the rotor to electrical energy and having an energy store and/or an additional, wind-independent energy generator, whose energy can be added to the wind-related output power of the wind energy installation/the windpark, characterized by the following steps:

a) during operation of the wind energy installation/the windpark, parameters are measured on the side of the wind energy installation facing the wind, said parameters describing the wind conditions in the measurement region, preferably the wind speed and/or the wind direction, b) the wind parameters are measured at horizontal distances from the rotor, which are selected such that at least one operational parameter of the wind energy installation, for example the angle of incidence of the wind on the rotor blade, can be adjusted in response to the measured wind parameters before the wind on which the wind parameters are based, in particular a wind front or a gust of wind, reaches the rotor, and c) depending on these wind parameters measured in the fore-zone of the wind energy installation, the energy store and/or the additional, wind-independent energy generator is/are controlled/regulated, in particular by power from the wind-independent energy generator and/or the energy store being added to wind-related output power of the wind energy installation.

This object also is achieved by a wind energy installation having a rotor, which can be driven by wind, with at least two rotor blades, whose respective angles of incidence of the wind can be adjusted independently of one another by means of at least one adjustment device, having a generator for converting the mechanical energy of the rotor to electrical energy and having a control/regulation device for carrying out the method according to the invention.

This object also is achieved by a windpark comprising a plurality of wind energy installations according to the invention, characterized in that at least one wind energy installation has a plurality of measurement stations associated with it for the purpose of measuring the parameters which describe the wind conditions on the side of the wind energy installation facing the wind, said measurement stations being spaced apart from one another and, in each case based on a main wind flow to be expected, being arranged on the side facing the wind at a horizontal distance from the wind energy installation, which distance is selected such that the angles of incidence of the wind on the individual rotor blades can be adapted in response to the measured wind parameters before the wind on which the wind parameters are based, in particular a wind front or a gust of wind, reaches the rotor, the measurement stations being arranged on an imaginary ring around the windpark.

The invention provides for, during operation of the wind energy installation, parameters to be measured with spatial and/or temporal resolution on the side of the wind energy installation facing the wind, said parameters describing the wind conditions in the measurement region, preferably the wind speed and/or the wind direction. The wind parameters are in this case measured at various vertical distances from the ground, namely various heights, and at horizontal distances from the rotor, which are selected such that the respective angles of incidence of the wind on the individual, at least two rotor blades can be adapted in response to the measured wind parameters before the wind on which the wind parameters are based, in particular a wind front or a gust of wind, reaches the rotor. In this case, values are predicted or calculated, in particular continuously or periodically, from the measured wind parameters—prognosis values—which describe wind conditions occurring in the future at the rotor blades for various heights. The angles of incidence of the wind on the individual rotor blades are adjusted individually and independently of one another, preferably a plurality of times during a complete revolution of a rotor blade, depending on these predicted or calculated prognosis values at the various heights. In a corresponding manner, the fore-zone measurements are carried out at such a high resolution that different wind conditions can also be predicted on the rotor blade plane of the wind energy installation for various heights.

Accordingly, detailed fore-zone measurements of the wind conditions are carried out differently than in the prior art at various heights, i.e. wind speed and/or wind direction are preferably determined at a sufficiently large distance in front of the respective wind energy installation. It is possible to draw conclusions from these wind conditions on the wind conditions prevailing in the future, i.e. after a specific time span, at the location of the rotor. It is possible to calculate from the distance from the wind energy installation or from the distance between the rotor and the measurement region at what point in time these wind conditions will prevail at various heights at the location of the wind energy installation. Finally, the angles of incidence of the wind on the at least two, generally three, rotor blades are adjusted independently of one another by means of the adjustment device depending on this calculation.

This is particularly advantageous in view of the ever larger wind energy installations in which the rotor blades cover particularly large areas, with the result that the individual rotor blades are often subjected to a wide variety of wind conditions during a complete revolution. For example, the tip of one rotor blade which is pointing upwards during a rotation may be subjected to a strong wind, while the tip of the other rotor blade which at the same time is pointing downwards at a slight angle may be subjected to an average or weak wind. In the context of the present invention, these various wind conditions are advantageously detected and/or determined at various vertical distances from the ground before they reach the rotor.

As far as the calculation of the prognosis values is concerned, this calculation is preferably carried out with the aid of 3D models of the (geographical localized surrounding environment of the wind energy installation influencing the wind conditions. In the case of a wind energy installation in a windpark, the wind energy installations which are arranged upstream of the wind flow and influence the wind conditions of the wind energy installation, for whose location the prognosis values are intended to be calculated, are naturally included in the calculation, for example.

Theoretically, the angle of incidence of the wind on the rotor blade can be adapted a plurality of times or else continuously to the future (for the rotor blades) wind conditions measured in the fore-zone during a complete rotation of a rotor blade about the rotor axis.

The wind parameters should preferably be measured at least in a region of a main wind flow to be expected—on the side of the wind energy installation facing the wind. When a wind energy installation is installed, it is generally known from measurements carried out in the past from which main wind direction or from which main wind directions winds are to be expected. The measuring means to be used for measuring the wind parameters can accordingly be essentially arranged such that they can detect the region of the main wind flows. If it is conceivable that the wind can blow from virtually all directions, it is naturally also within the context of the invention to place the measuring means such that the wind parameters can be measured in any conceivable region around the wind energy installation.

As far as the horizontal distance is concerned at which the wind parameters are measured based on the rotor, this distance—as has already been mentioned further above—should preferably be selected such that the time which the wind requires from this point up to the rotor is sufficient for adjusting operational parameters of the wind energy installation, in particular the angles of incidence of the wind on the rotor blade(s), in response to the measured and in particular evaluated wind parameters before the wind then reaches the rotor. The greater a maximum wind speed is which is to be expected in the area of the wind energy installation to be installed, in this case the greater the horizontal distance of the measurement region from the rotor blade plane will be in order to meet the abovementioned condition since the gust of wind measured in front of the installation overcomes the path between the measurement region and the rotor correspondingly rapidly.

At least a horizontal distance of at least 1 metre, preferably of at least 10 metres, particularly preferably of at least 20 metres, from the rotor blade plane is expediently provided. Greater or smaller distances are naturally also conceivable.

The measurement of the wind parameters takes place in various vertical layers of air. In one preferred embodiment of the present invention, at least one wind parameter is measured at a vertical distance from the ground, the value of this distance being in a range between the point closest to the ground and the point furthest away from the ground of the area covered by the rotor blade of the wind energy installation. This ensures that the wind is measured in addition and particularly at the level of the rotor blades. It can be assumed from this that wind conditions which are measured at this height in front of the wind energy installation are identical to the wind conditions occurring later at the location of the rotor, in particular at the location of the rotor blades, but at least have a direct correlation with them. It is also conceivable to carry out measurements at various horizontal distances from the rotor.

One or more wind parameters can preferably be measured, based on a front view of the side of the wind energy installation facing the wind, within an imaginary ring-shaped region around the rotor hub, with an inner radius of the ring-shaped region which is greater than half the distance between the rotor hub and the rotor blade tip and with an outer radius which is greater than ¾ of the distance between the rotor hub and the rotor blade tip. The outer radius is preferably equal to or greater than the entire distance between the rotor hub and the rotor blade tip. In particular, this ensures that the wind in the fore-zone of the wind energy installation is measured in a region which, as the wind progresses further in the direction of the wind energy installation, is presumably relevant for the wind conditions at the rotor blade tip(s) of the installation.

A wind energy installation for carrying out the abovementioned methods has a rotor, which can be driven by wind, with at least two rotor blades, whose respective angles of incidence of the wind can be adjusted independently of one another by means of at least one adjustment device, it has a generator for converting the mechanical energy of the rotor to electrical energy and it has a control/regulation device for carrying out the methods.

The wind energy installation preferably has associated measuring means, which are designed such that they can measure parameters, which describe the wind conditions at a spatial, at least horizontal distance from the rotor on the side of the wind energy installation facing the wind, at various vertical distances from the ground, namely various heights.

Particularly preferably, sodar devices can be used which are in particular capable, preferably from the ground, of determining the wind conditions in various vertical layers of air.

Such sodar devices can be positioned at the suitable horizontal distance on the side of the wind energy installation facing the wind. The measuring means can in this case, for example, be distributed over a specific solid angle starting from the wind energy installation. In theory, the measuring means can be positioned, starting from the wind energy installation, in any direction from which wind flow is to be expected. In the simplest case, the measuring means may be anemometers or other wind measuring means, which are arranged at the suitable horizontal distance from the wind energy installation at various vertical heights above the ground.

The measuring means are preferably arranged on a plurality of measurement stations, which are spaced apart from one another, are associated with the wind energy installation and, in each case based on a main wind flow to be expected, are arranged on the side facing the wind at a horizontal distance from the wind energy installation, which distance is selected such that the angles of incidence of the wind on the rotor blades can be adapted individually in response to the measured wind parameters before the wind on which the wind parameters are based, in particular a wind front or a gust of wind, reaches the rotor.

The measurement stations can naturally also be arranged around the wind energy installation in all directions, in particular even in the directions of the wind energy installations, from which directions generally no or only little wind is to be expected. The measurement stations can in the process completely surround the wind energy installation, for example by them being arranged on an imaginary ring around the wind energy installation.

The number of measurement stations, the distance between respectively adjacent measurement stations, and the measuring means arranged at the measurement stations are preferably matched to one another such that preferably essentially continuous measurement of the wind parameters is made possible between in each case two measurement stations.

Such measurement stations can primarily be used in offshore wind energy installations. The measurement stations associated with the offshore wind energy installation are in this case preferably connected to the seabed or anchored in or to the seabed fixedly, either directly or indirectly. They may preferably have a foundation which is let into the seabed. It is alternatively conceivable for the measurement stations to have a floating design, in which case they are preferably positioned essentially fixed in position in/on the seabed by means of suitable anchoring devices.

A windpark, which achieves the object of the present invention, has a plurality of wind energy installations according to the invention, characterized in that at least one wind energy installation has a plurality of measurement stations associated with it for the purpose of measuring the parameters which describe the wind conditions on the side of the wind energy installation facing the wind, said measurement stations being spaced apart from one another and, in each case based on a main wind flow to be expected, being arranged on the side facing the wind at a horizontal distance from the wind energy installation, which distance is selected such that the angles of incidence of the wind on the individual rotor blades can be adapted in response to the measured wind parameters before the wind on which the wind parameters are based, in particular a wind front or a gust of wind, reaches the rotor, the measurement stations being arranged on an imaginary ring around the windpark.

In one further embodiment of the present invention, a method for adapting at least one wind energy installation of such a windpark having a plurality of wind energy installations to given wind conditions is provided, in which at least one operational parameter of the wind energy installation, in particular the angle of incidence of the wind on a rotor blade and/or the position of the rotor blade in relation to the wind, at least of a wind energy installation of the windpark which is arranged downstream based on the wind flow being adjusted depending on at least one operational parameter of at least one other wind energy installation of the windpark arranged upstream, the wind installation arranged upstream preferably being arranged in the outer edge region of the windpark.

Accordingly, a wind energy installation which is arranged downstream is operated depending on the operational parameters of a wind energy installation of a windpark arranged upstream. The individual wind energy installation(s) arranged upstream can in this case naturally itself/themselves in turn be operated depending on further wind energy installations arranged upstream of it/them. Alternatively, the wind energy installations arranged upstream can naturally be operated according to the methods described above. Accordingly, they can, for example, in each case be adapted to given wind conditions depending on wind parameters measured in their fore-zone.

The object of the present invention is also achieved by a method for operating a wind energy installation or a windpark comprising such wind energy installations is specified having the following steps:

a) during operation of the wind energy installation/the windpark, parameters are measured on the side of the wind energy installation facing the wind, which parameters describe the wind conditions in the measurement region, b) the wind parameters are measured at horizontal distances from the rotor, which are selected such that at least one operational parameter of the wind energy installation, for example the angles of incidence of the wind on the rotor blade, can be adjusted in response to the measured wind parameters before the wind on which the wind parameters are based, in particular a wind front or a gust of wind, reaches the rotor, c) depending on the measured wind parameters, the power output of the wind energy installation/the windpark to a superordinate power supply system to which the wind energy installation/the windpark is connected is controlled/regulated, and d) the regulation/control of the power output takes place depending on the measured wind parameters in accordance with predetermined power output scenarios.

The abovementioned aspect of the present invention makes it possible for the installation to have a behaviour which is as defined as possible in response to wind parameters measured in the fore-zone of said installation.

In accordance with one preferred power output scenario, in the event of a future rise or fall in the power output of the wind energy installation/the wind energy park to be expected on the basis of the measured wind parameters, for example owing to a stronger or weaker wind, at least one operational parameter of the wind energy installation/the windpark, preferably the angle of incidence of the wind on one or more rotor blades of one or more wind energy installations, is adjusted such that the rise or fall in the power output is counteracted.

In one further embodiment, in the event of a future fall in the power output of the wind energy installation/the wind energy park to be expected on the basis of the measured wind parameters, for example owing to a weaker wind, at least one operational parameter of the wind energy installation/the windpark is adjusted such that a falling power output in accordance with a predetermined function takes place, in particular a linearly falling power output.

In one further embodiment, in the event of a future rise in the power output of the wind energy installation/the wind energy park to be expected on the basis of the measured wind parameters, for example owing to a stronger wind, at least one operational parameter of the wind energy installation/the windpark is adjusted such that a rising power output in accordance with a predetermined function takes place, in particular a linearly rising power output.

If, accordingly, the fore-zone measurements in front of the wind energy installation show, for example, that the wind which will reach the wind energy installation after the measurement suddenly becomes weaker, the wind energy installation can, for example, be controlled such that the power output is not accordingly ended abruptly but is reduced in accordance with a predefined function.

In the event of a temporary rise—peak—in the power output to be expected on the basis of the measured wind parameters, for example caused by a gust, at least one operational parameter of the wind energy installation/the windpark, preferably the angle of incidence of the wind on the rotor blade, is preferably adjusted such that at most a weakened peak, preferably no corresponding peak, then occurs in the actual power output.

As is known to a person skilled in the art, there is a wide variety of power output scenarios which can be used in an expedient manner depending on the fore-zone measurements of the wind in order to allow for a power output response which is as reliable and defined as possible.

The object of the present invention is also achieved by a method for operating a wind energy installation or a windpark comprising such wind energy installations, in particular in accordance with one of the abovementioned methods, is made available, the wind energy installation having a rotor, which can be driven by wind, with at least one rotor blade, having a generator for converting the mechanical energy of the rotor to electrical energy and having an energy store and/or an additional, wind-independent energy generator, whose energy can be added to the wind-related output power of the wind energy installation/the windpark. The method is in this case characterized by the following steps:

a) during operation of the wind energy installation/the windpark, parameters are measured on the side of the wind energy installation facing the wind, said parameters describing the wind conditions in the measurement region, preferably the wind speed and/or the wind direction, b) the wind parameters are measured at horizontal distances from the rotor, which are selected such that at least one operational parameter of the wind energy installation, for example the angle of incidence of the wind on the rotor blade, can be adjusted in response to the measured wind parameters before the wind on which the wind parameters are based, in particular a wind front or a gust of wind, reaches the rotor, and c) depending on these wind parameters measured in the fore-zone of the wind energy installation, the energy store and/or the additional, wind-independent energy generator is/are controlled/regulated, in particular by power from the wind-independent energy generator and/or the energy store being added to wind-related output power of the wind energy installation.

This aspect of the present invention makes it possible, in particular, to design the power output of wind energy installations or windparks to be as constant as possible in a manner which, as far as possible, is independent of the actually occurring wind. For example, wind-related energy of the wind energy installation, i.e. energy produced by the rotor rotation, can be stored in the energy store during phases with a severe wind and can be output at times when there is a weak wind in order to keep the output power of the wind energy installation constant. Alternatively or in addition, energy from the separate energy generator, for example a thermal power plant, a diesel generator or the like can be added.

Accordingly, the output power of the wind energy installation or its power output to a superordinate power supply system is controlled/regulated by controlling the wind-independent energy generator and/or the energy store such that it has an essentially constant profile.

In one expedient embodiment, the energy generator and/or the energy store is/are switched on or off depending on the wind parameters measured in the fore-zone. In particular, dependent switching-on of the energy generator is advantageous since wind-independent energy generators often require a certain amount of lead time once they have been switched on in order to be able to make available power or energy.

In one further embodiment of the present invention, prognosis values can be calculated—in particular continuously or periodically—based on the wind parameters measured in the fore-zone of the wind energy installation, which prognosis values in each case represent the (future) power output of the wind energy installation. These prognosis values for power output can be made available or communicated to the electricity network operator in each case via a data network. The electricity network operator can take dedicated, suitable regulating measures depending on these prognosis values. Present operational data relating to the wind energy installation can also be used in the calculation of the prognosis values for power output.

As is known to a person with knowledge of the prior art, all the methods mentioned in the context of this application can be combined with one another. As is further known to a person skilled in the art, all of the methods described in the context of the application can be used for regulation and/or control by means of suitable control and/or regulation devices.

BRIEF DESCRIPTION OF THE DRAWINGS

Further features of the present invention are given in the attached dependent claims, the description below of specific exemplary embodiments and the attached drawings, in which:

DETAILED DESCRIPTION OF THE PREFERRED EMBODIMENTS

Figure 1:
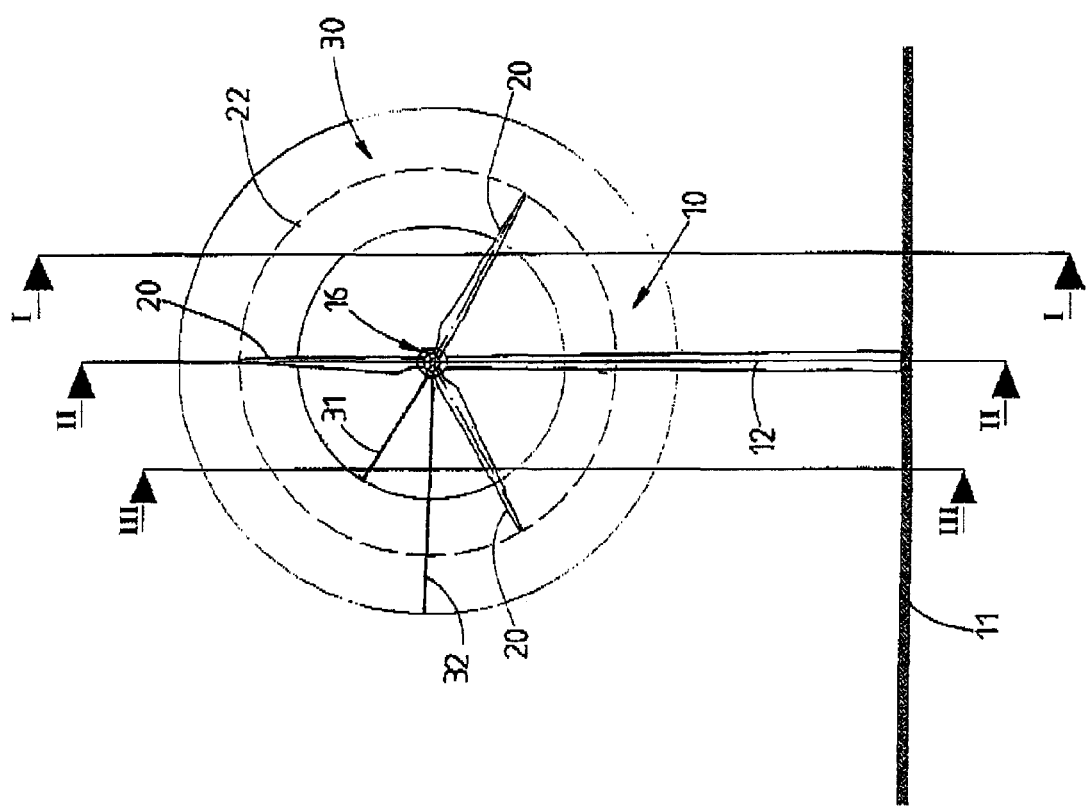
FIG. 1 shows a front view of a wind energy installation.

FIGS. 1-4 show a wind energy installation 10 which, at the end of a vertical tower 12 arranged on a horizontal base 11, has a pod 14 arranged on the upper side of the tower. A rotor 16, which has a hub 18, is arranged at an end facing the wind of the pod 14. Three rotor blades 20 of the rotor 16 are connected to the hub 18, the rotor blade bases of the rotor blades 20 being inserted into corresponding openings in the hub 18 and being connected to said hub in a known manner.

The rotor 16 rotates about an axis which is slightly upwardly inclined with respect to the horizontal. As soon as wind hits the rotor blades 20, the rotor 16 together with the rotor blades 20 is set in rotation about the rotor axis. The rotor blades 20 in the process cover an imaginary circular area 22, whose contours are illustrated by dashed lines. The rotor blades 20 can be altered individually in terms of their position in relation to the wind, i.e. the angle of incidence of the rotor blades 20 in relation to the wind can be adjusted, by means of an adjustment device (not illustrated) which is, however, known to those with knowledge of the prior art.

The basic design of the wind energy installation 10 with an at least approximately horizontal rotor axis is known in the prior art, and is therefore not shown in detail.

Figure 2:
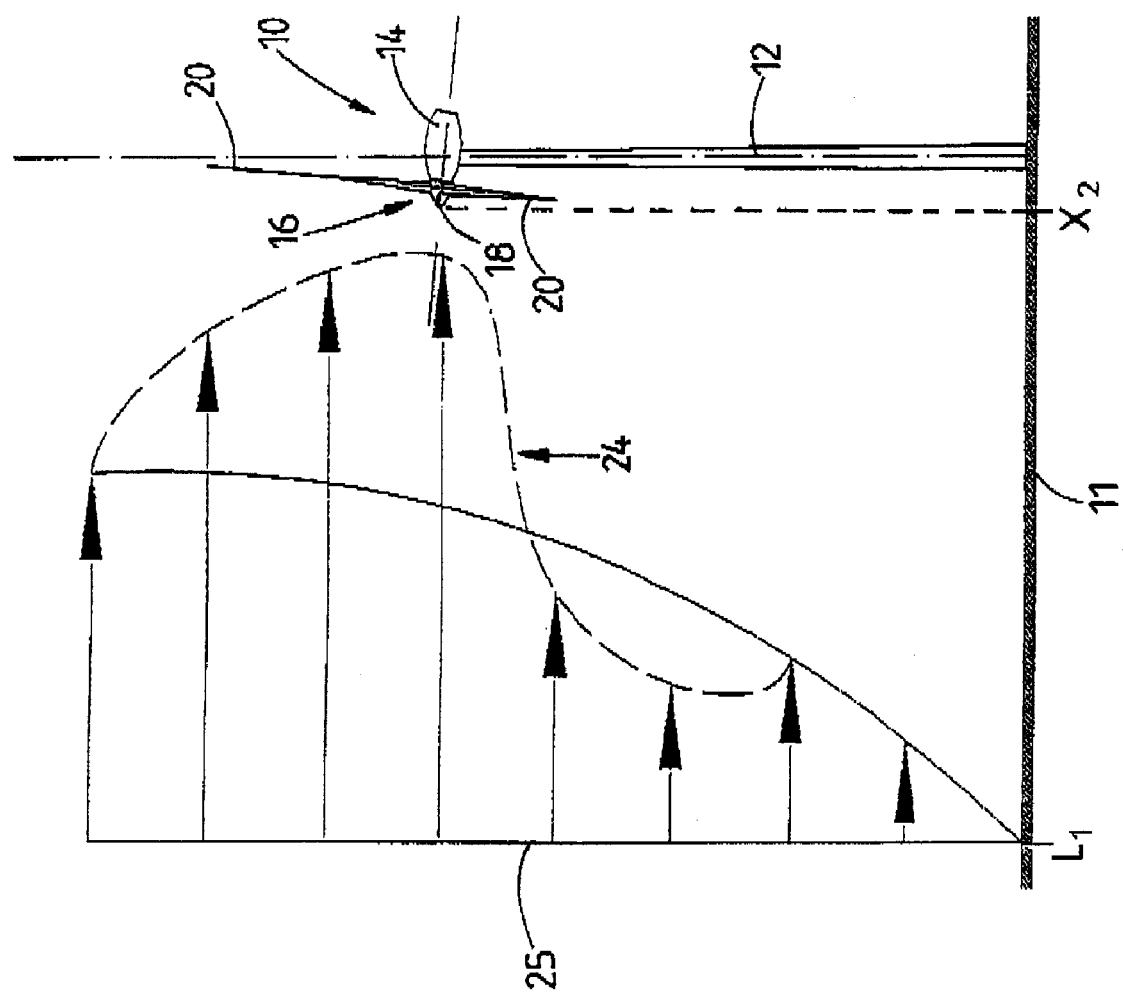
FIG. 2 shows a section along the section line I-I in FIG. 1.
Figure 3:
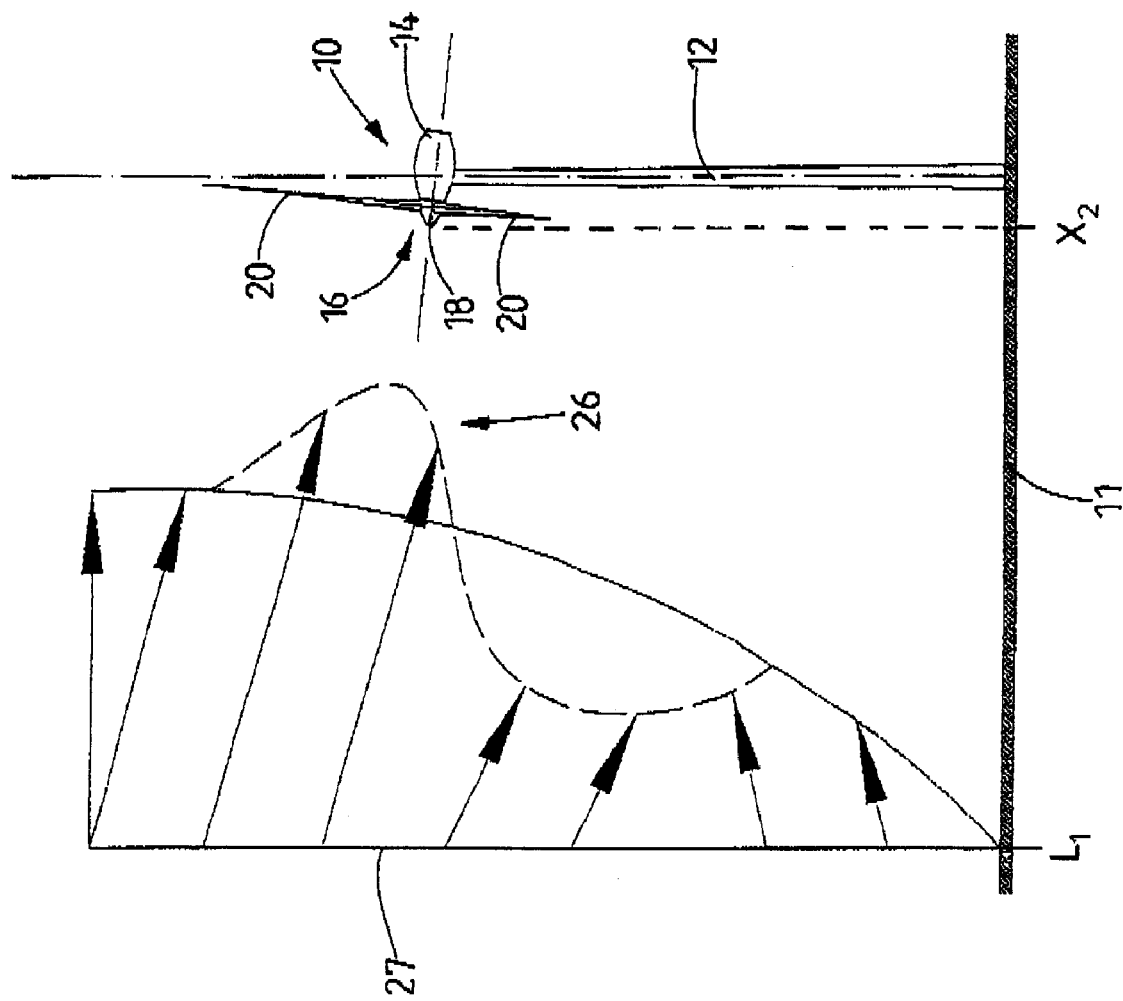
FIG. 3 shows a section along the section line II-II in FIG. 1.

FIGS. 1-3 show various regions 24, 26, 28 of a gust of wind moving in the direction of the wind energy installation 10. The wind energy installation 10, in particular the rotor 16, is facing the gust of wind.

The individual regions 24, 26, 28 of the gust of wind represent the gust of wind at a horizontal distance $L_1$-$X_2$ from the rotor 16, in particular the rotor tip. The regions 24, 26, 28 of the gust of wind which are illustrated in each case by arrows and an enveloping dashed line represent the wind parameters of the gust of wind at various distances from the ground along in each case vertical measurement paths 25, 27, 29, which in each case end at an imaginary base line $L_1$ extending at right angles of the plane of the drawing. The lengths of the arrows in this case represent the relative absolute values of the wind speed, while the arrow directions indicate the respective wind direction.

FIG. 2 shows, for example, the region 24 of the gust of wind, whose parameters have been measured along the measurement path 25 in each case at various vertical distances from the ground at the horizontal distance $L_1$-$X_2$ from the rotor 16. The measurements took place based on the circular area 22 in the right-hand region thereof, but starting from the region close to the ground up to a region ending above the circular area 22. It can be seen in particular from the respective length of the arrows that the wind in the upper region of the rotor blade plane or the circular area 22 is very severely pronounced, while a markedly lower wind speed prevails in the lower region of the rotor blade plane. In this case, the wind direction is in each case horizontal.

FIG. 3 shows the region 26 of the gust of wind, whose parameters have likewise been measured in each case at various vertical distances from the ground at the horizontal distance $L_1$-$X_2$, from the rotor 16, to be precise along the measurement path 27. The measurements took place in relation to the circular area 22 in the central region thereof, namely starting from the region close to the ground up to a region ending above the circular region 22. The region 26 of the gust of wind likewise has high wind speeds in the region of the upper rotor blade plane, but these wind speeds are directed slightly at an angle with respect to the ground. In the region close to the ground, on the other hand, the wind speeds are markedly lower and are directed at a slight angle upwards.

Figure 4:
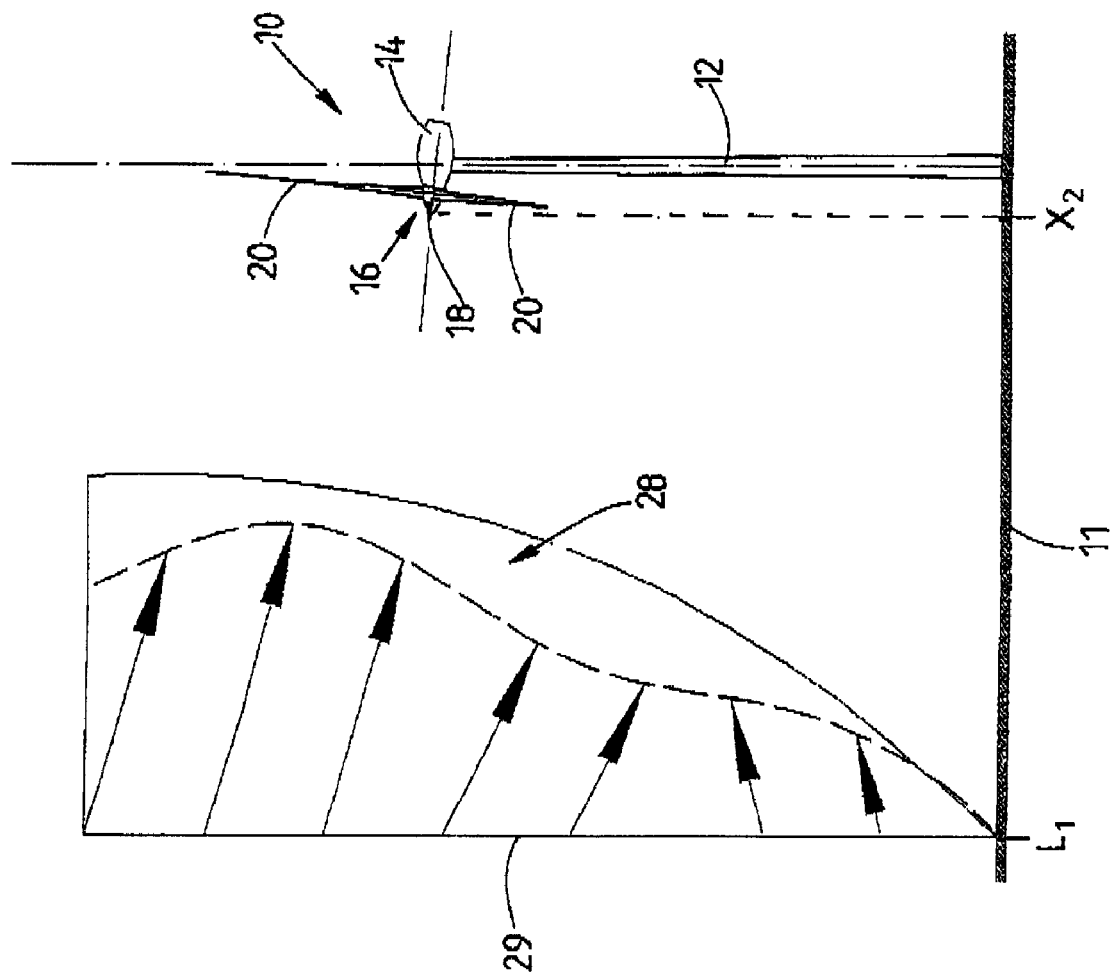
FIG. 4 shows a section along the section line III-III in FIG. 1.

Overall, it can be seen from FIGS. 2-4 that a gust of wind or a wind front which approaches the wind energy installation 10 has various wind parameters in various spatial regions. The rotor blades 20 of the wind energy installation 10 are therefore also subjected to different forces, depending on the individual position of the respective rotor blade 20 when the gust of wind impinges on it.

According to the invention, the wind energy installation 10 has at least one wind measuring device (not explicitly illustrated), namely a sodar device, along the base line $L_1$, said wind measuring device measuring the wind parameters of the wind along the measurement paths 25, 27, 29 such that a wind profile with spatial and possibly temporal resolution is measured at the horizontal distance $L_1$-$X_2$ from the rotor 16.

In principle, in one preferred embodiment of the present invention, one or more wind parameters can be measured within an imaginary ring-shaped region 30 around the rotor hub 18, based on the front view of the wind energy installation 10 illustrated in FIG. 1, preferably with an inner radius 31 of the ring-shaped region which is greater than half the distance between the rotor hub 18 and the rotor blade tips 21 of the rotor blades 20 and with an outer radius 32 which is greater than the distance between the rotor hub 18 and the rotor blade tips 21. This would ensure that the wind in the fore-zone of the wind energy installation 10 is measured in a region which, as the wind progresses further in the direction of the wind energy installation, is presumably relevant for the wind conditions at the rotor blade tip(s) of the installation.

The above-described data of the wind profile are communicated to a control/regulation device of the wind energy installation 10, which calculates, inter alia, the time span after which the wind conditions—or at least similar wind conditions which can be derived therefrom—which where measured at the measurement time along the measurement paths 25, 27, 29 will prevail at the location of rotor 16, in particular at the location of the rotor blades 20. Depending on these results, the rotor blades 20 are adjusted along their longitudinal axes by means of the adjustment device (not illustrated), i.e. their angles of incidence of the wind are adapted to the wind conditions in a suitable manner.

As is known to a person skilled in the art, depending on the measured wind parameters in the fore-zone of the wind energy installation 10, not only the respective angles of incidence of the wind on the rotor blades 20 can be adjusted but it is also possible for a wide variety of other operational parameters of the wind energy installation to be adapted, in particular regulated.

LIST OF REFERENCE SYMBOLS

10 Wind energy installation
11 Underground
12 Tower
14 Pod
16 Rotor
18 Hub
20 Rotor blade
21 Rotor blade tip
22 Circular area
24 Region of gust of wind
25 Measurement path
26 Region of gust of wind
27 Measurement path
28 Region of gust of wind
29 Measurement path
30 Ring-shaped region
31 Inner radius
32 Outer radius

What is claimed is:

1. A method for operating a wind energy installation, wherein the wind energy installation (10) comprises a rotor (16), which can be driven by wind, with at least one rotor blade (20), and a generator for converting mechanical energy of the rotor (16) to electrical energy, comprising the steps of:
   a) during operation of the wind energy installation (10), measuring parameters on the side of the wind energy installation (10) facing the wind, which parameters describe the wind conditions in the measurement region;
   b) measuring the wind parameters at horizontal distances from the rotor (16), which are selected such that an angle of incidence of the at least one rotor blade can be adjusted in response to the measured wind parameters before the wind on which the wind parameters are based reaches the rotor (16);
   c) depending on the measured wind parameters, controlling and/or regulating the power output of the wind energy installation (10) to a superordinate power supply system to which the wind energy installation (10) is connected; and
   d) the controlling and/or regulating of the power output takes place depending on the measured wind parameters in accordance with predetermined power output scenarios, wherein
      i) in the event of an expected fall in the power output of the wind energy installation based on the measured wind parameters, adjusting the angle of incidence of the at least one rotor blade such that the fall in the power output takes place in accordance with a predetermined function, and
      ii) in the event of an expected rise in the power output of the wind energy installation based on the measured wind parameters, adjusting the angle of incidence of the at least one rotor blade such that the rise in the power output takes place in accordance with a predetermined function.

2. The method according to claim 1, wherein, in the event of the expected rise or fall in the power output of the wind energy installation (10) based on the measured wind parameters, adjusting the angle of incidence of the at least one rotor blade such that the expected rise or fall in the power output is counteracted.

3. The method according to claim 1, wherein, in the event of an expected temporary rise in the power output based on the measured wind parameters, adjusting the angle of incidence of the at least one rotor blade such that at most a weakened peak or no corresponding peak then occurs in the actual power output.

* * * * *

UNITED STATES PATENT AND TRADEMARK OFFICE
CERTIFICATE OF CORRECTION

PATENT NO.        : 7,522,976 B2                                          Page 1 of 1
APPLICATION NO.  : 11/530947
DATED             : April 21, 2009
INVENTOR(S)       : Matthias Stommel It is certified that error appears in the above-identified patent and that said Letters Patent is hereby corrected as shown below:

On the Title page, Item (73)

"Assignee"

"Daubner & Stommel GBR-Werk-Planung" should read --Daubner & Stommel GbR Bau-Werk-Planung--

Signed and Sealed this

Thirtieth Day of June, 2009

JOHN DOLL
*Acting Director of the United States Patent and Trademark Office*